O. J. OLSON.
SPRING WHEEL.
APPLICATION FILED JAN. 19, 1912.
1,063,465.
Patented June 3, 1913.
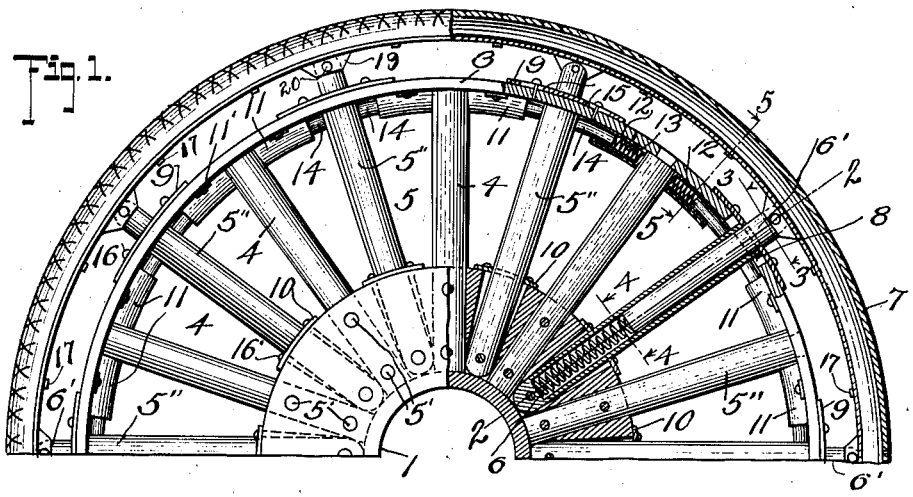
Fig. 1.
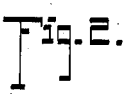
Fig. 2.
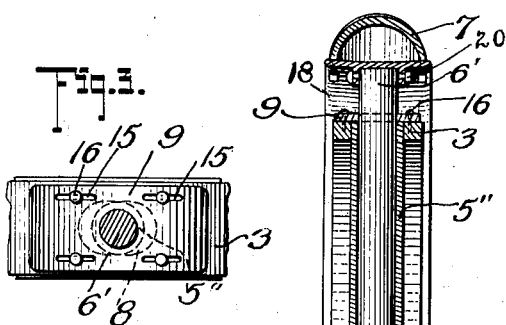
Fig. 3.
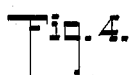
Fig. 4.
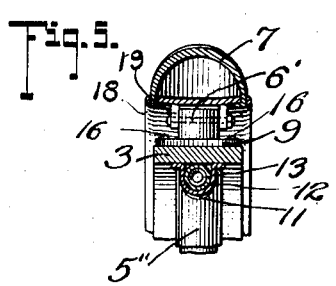
Fig. 5.
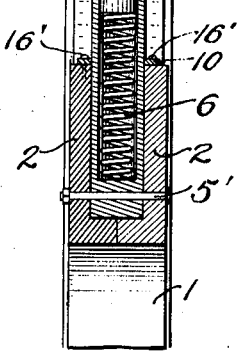
Witnesses
C. H. Wagner.
G. W. Ripley.
Inventor
Otto J. Olson
By
Robb
Attorneys.

UNITED STATES PATENT OFFICE.

OTTO J. OLSON, OF COURTENAY, NORTH DAKOTA.

SPRING-WHEEL.

1,063,465.  Specification of Letters Patent.  Patented June 3, 1913.

Application filed January 19, 1912. Serial No. 672,167.

*To all whom it may concern:*

Be it known that I, OTTO J. OLSON, a subject of the King of Norway, residing at Courtenay, in the county of Stutsman and State of North Dakota, have invented certain new and useful Improvements in Spring-Wheels, of which the following is a specification.

This invention relates to improvements in vehicle wheels and particularly to that class termed spring wheels. Its primary object is to provide a simple and compact construction which will afford the desired resiliency without the use of inflated tires, and at the same time a strong and efficient structure for the purpose for which it may be employed.

My invention further contemplates the provision of resilient means to permit the necessary circumferential movement of the tread member in coöperation with supporting means for the latter and the rim of the wheel.

For a full understanding of the present invention, reference is to be had to the following descritpion and to the accompanying drawings, in which—

Figure 1 is a fragmentary view, partly in section, of a wheel constructed in accordance with my invention; Fig. 2 is a vertical sectional view on the line 2—2 of Fig. 1; Fig. 3 is a partial sectional view taken about on the line 3—3 of Fig. 1 showing the closure plate for the slots in the rim of the wheel; Fig. 4 is a partial sectional view taken about on the line 4—4 of Fig. 1 showing the closure plate for the recesses in the hub, and Fig. 5 is a partial sectional view taken about on the line 5—5 showing more clearly the circumferential rim casings.

Throughout the following detail description and on the several figures of the drawings, similar parts are referred to by like reference characters.

Referring now to the drawings and specifically describing the invention, a wheel constructed in accordance therewith comprises essentially a hub 1 formed with side plates 2, the rim 3, and a plurality of rigid spokes 4 secured at their lower ends between the plates 2 by means of bolts 5' and at their opposite ends to the rim 3 by riveting or some similar manner. Preferably mounted between the rigid spokes 4 are located the radial spoke members 5 consisting in each instance of a tubular casing 5'' pivotally mounted at its lower end between the plates 2 of the hub, said casing extending adjacent to the rim 3 and having located in the lower portions of the same spiral springs 6 against the outer ends of which is seated the spoke member or plunger 6'. The outer ends of the spoke members 6' are secured to and support the circumferential tread member 7 which may be of any desired shape but is illustrated herein as U-shaped. The rim 3 is provided with a series of elongated slots 8 through which the spoke members 6 pass and on the upper surface of the rim are mounted the closure plates 9 which effectually cover the recesses 8 and prevent the collection of dust and dirt therein. The closure plates 9 are provided with openings therethrough through which the spoke members 6' pass and are slidably mounted so as to permit circumferential movement of said members as will be hereinafter more fully disclosed. Similar closure plates 10 are slidably mounted on the upper portion of the side plates 2, the casings 5'' passing therethrough and the plates performing the same function as the plates 9 in reference to preventing the collection of dust and dirt in the openings between the plates 2 of the hub.

Located at opposite sides of the rigid spokes 4 and secured to the rim 3 by means of fastenings 11' are circumferential rim casings 11, having mounted therein cylinders 12, said cylinders containing spiral springs 13 seated at their inner ends against the opposite sides of the spokes 4.

Designated by the numeral 14 are lateral plungers which bear against the outer ends of the springs 13 at one end, while at their other end they bear against the tubular casings 5''.

As will be apparent the resilient means just described will readily permit the necessary circumferential movement of the tread member 7 in the use of the wheel.

As will be noted from Figs. 3 and 4 the closure plates 9 and 10 are provided with slots 15 and 15' respectively through which screws 16 and 16' pass and by means of which screws the plates are slidably secured to the rim 3 and the hub 1 of the wheel.

The tread member 7 is preferably formed with a corrugated surface to prevent slipping and the annular edge portions are provided with a plurality of flexible locking projections 17 which are adapted to be inserted through openings in the annular plate 18 and clenched thereagainst in the construction of said tread member. The plate 18 has also formed thereon at suitable intervals spaced ears 19 between which the outer ends of the spoke members 6, are pivotally secured as by means of the bolts 20, or similar fastenings.

Having thus described the invention, what is claimed as new is:

1. In a spring wheel, the combination of a hub, a rim, rigid spokes connecting the hub and rim, said hub and rim having openings therein, a tread member spaced from the rim, a series of spoke members for supporting the tread member, said spoke members comprising plungers pivotally connected at their outer ends to the tread member and passing through the rim openings aforesaid, tubular casings in which the plungers are mounted, pivotally secured to the hub and passing through the hub openings, springs in said casings on which the plungers are seated, resilient means carried by the rim between the rigid spokes and casings to permit circumferential movement of the spoke members, coverings for the openings aforesaid having slots therein, and fastening means for said coverings passing through the slots, whereby the circumferential movement of the spoke members may be limited.

2. In a spring wheel, the combination of a hub formed with side plates, a rim having a series of elongated openings therein, rigid spokes mounted at one end between the plates of the hub and connected at their other end to the rim aforesaid, a series of spoke members intermediate the rigid spokes aforesaid and comprising tubular casings pivotally mounted at one end between the plates of said hub and engaging the rim at the other end, springs mounted in said casings, plungers seated at one end against the springs and passing through the openings in the rim and connected at their other end to the tread member to support the same, circumferential rim casings secured to the rim at opposite sides of the rigid spoke members, springs mounted in said rim casings, and lateral plungers bearing at one end against the springs in the rim and at their other end against the tubular casings aforesaid to permit circumferential movement of the spoke members.

In testimony whereof I affix my signature in presence of two witnesses.

OTTO J. OLSON.

Witnesses:
GEO. E. BRASTRUP,
A. M. CHIDLEY.